(12) United States Patent
Anderson (10) Patent No.: US 6,799,751 B1
(45) Date of Patent: Oct. 5, 2004

(54) QUICK ADJUSTING CHOKE WINCH

(76) Inventor: Tony D. Anderson, 152 Charles Anderson La., Pageland, SC (US) 29728

( * ) Notice: Subject to any disclaimer, the term of this patent is extended or adjusted under 35 U.S.C. 154(b) by 0 days.

(21) Appl. No.: 10/619,846

(22) Filed: Jul. 15, 2003

(51) Int. Cl.$^7$ .............................................. B65D 67/02
(52) U.S. Cl. .................... 254/223; 24/68 CD; 24/69 ST
(58) Field of Search ................................. 254/217, 223; 24/69 ST, 71 ST, 68 CD (56) References Cited

U.S. PATENT DOCUMENTS

| | | | | |
|---|---|---|---|---|
| 2,270,271 | A | * | 1/1942 | Coffing ........................ 254/223 |
| 3,826,473 | A | | 7/1974 | Huber |
| 4,268,012 | A | | 5/1981 | Ruehle et al. |
| 4,823,443 | A | * | 4/1989 | Waters ..................... 24/68 CD |
| 6,076,805 | A | | 6/2000 | Messersmith |
| 6,322,279 | B1 | * | 11/2001 | Yamamoto et al. ........... 403/97 |

* cited by examiner

Primary Examiner—Emmanuel M Marcelo
(74) Attorney, Agent, or Firm—F. Rhett Brockington (57) ABSTRACT

The invention is a quick adjusting choke winch, wherein in contrast to a winch where the strap is threaded from an end of the choke strap, the choke strap is side-threaded along a longitudinal edge. The invention is appropriately sized so that multiple width straps can be accommodated. The quick adjusting choke winch is comprised of: a base plate having a bearing; an open-ended split-center shaft; at least two pack rollers for controlling the tangential angle of strap being wound; a means for guiding the choke strap within the winch; a ratchet plate; a releasable main pawl; a releasable safety pawl; a means for turning the open-ended split-center shaft; a cover plate; and at least one fastening element for attaching the cover plate. The ratchet plate is co-axially affixed to the open-ended split-center shaft, so that when the ratchet turns the open-ended split-center shaft turns through the same rotation. Mounted on the same side of the plate are an end of the open-ended split-center shaft, an end of the at least two pack rollers, the means for guiding the strap, an end of the main pintle, and an end of the safety pintle. The cover plate is removably mounted to at least the pack rollers, and receives the open-end of the split-center shaft. The split-center of the open-ended split-center shaft has an opening that is sufficiently wide to receive the thickness of the choke strap.

23 Claims, 8 Drawing Sheets

QUICK ADJUSTING CHOKE WINCH

BACKGROUND

1) Field of the Invention

The invention relates generally to a winch, and more particularly to a side-threading winch which can be quickly affixed to a choke strap, and tightening the same.

2) Prior Art

Choke straps are used by crane operators and the like to attach the crane hook to the object to be lifted. During lifting, the object has a desired orientation. The desired orientation is dependent on a number of possible considerations, including, but not limited to: the size of the space through which the object is to be moved, whether the object being lifted is to be connected to another device having a precise orientation, the levelness of the object being lifted (i.e. a pallet loaded with multiple objects that are only partially secured), and the effectiveness of the choke during the lift. If the orientation is wrong, the choke strap may not be secured, causing the choke to shift and the object being lifted to sift further or fall. The proper positioning and the effective length of the choke straps determines whether the desired orientation is achieved. To confirm that in fact the choke straps are properly positioned the crane operator will usually lift the object only slightly off its supporting surface, thereby confirming that none of the straps are slack, and that the object has the proper orientation. If a strap is slack or the orientation is wrong then a strap is not carrying the desired proportion of the load. Also, a slack choke strap is an indication that the center of gravity is off-line of the lifting force, and a disproportionate weight will be placed one or more of the other choke straps. To correct loose strap(s) and the orientation, the crane operator sets the object back down on its supporting surface, and the choke strap(s) is adjusted. The adjustment is usually made by either repositioning its choke position on the object, by adding another wrap to the strap, by using a shorter choke strap or by a combination thereof. The adjustment process to remove the slack is time consuming, and often has to be repeated numerous times because it is largely one of an educated guess. The problem is especially difficult to correct when the object has a complex asymmetrical shape.

What is needed a means whereby the slack can be quickly taken out of the choke strap with out either repositioning the strap, adding another wrap to the strap or changing to a shorter length strap. A possible solution is to attach the choke strap to a come-along. As a practical matter the addition of a come-along to the strap cures one problem, but causes another. The come along adds length to the choke strap, and accordingly shorter strap must be used to accommodate for the length of the come-along. The come-along adds weight, and if multiple choke straps are fitted with come-alongs, then the overall usable lifting force is lowered. Most come-alongs have a handle which can become entangled with the other straps. Since, it is not known in advance which strap will need to be adjusted, one could potentially pre-fit each strap with a come-along. The addition of multiple come-alongs also costs, increases the possibility for mechanical failure and therefore poses a safety problem. Another possible solution to removing the slack is to attach an end of the strap to a conventional strap winch. Similar problems are encountered, plus a conventional strap winch requires end on threading. What is further needed is a means of adjusting the strap that does not require the strap to be changed, does not disconnect from either the object or the crane hook, does not add length to the strap, and does not require end on threading.

SUMMARY OF THE INVENTION

The invention is a device which enables the effective length of a strap, and in particular a choke strap already attached, to be quickly adjusted. Choke straps can be of any width, but are typically 2, 3, 4, 6, and 8 inches wide and ¼ inch thick. The choice of the appropriate strap is largely dependent on the weight of the object being lifted. At least two, and often three or more straps are employed to give the object proper orientation when lifted. The invention is a device that can be attached to a choke strap without disconnecting the strap, a device that does not require end on threading, a device that does not add length to the strap, and a device that does not interrupt the continuity of the strap. In the scenario described in the Background of the Invention, when the crane operator lifts the object slightly off the supporting surface, and finds that a strap is loose, the invention can be fitted onto the choke strap, and the strap can be shorten to the needed effective length. The choke strap need not be repositioned, changed or wrapped. The choke strap is left attached to the object and the crane hook. The invention is a side-threading winch, wherein in contrast to a conventional winch where the strap is threaded from an end of the strap, the strap is threaded along a longitudinal edge. The invention can also be end threaded like a conventional winch. The quick adjusting choke winch is appropriately sized so that multiple width straps can be accommodated. For instance, one size quick adjusting choke winch can accommodate a 2, 3 and 4 inch wide strap. The quick adjusting choke winch is comprised of: a base plate having a bearing; an open-ended split-center shaft; at least two pack rollers for controlling the tangential angle of the strap being wound; a means for guiding the strap within the winch; a ratchet plate; a releasable main pawl, main pintle and main torsion spring; a releasable safety pawl safety pintle and safety torsion spring; a means for turning the open-ended split-center shaft; a cover plate; and at least one fastening element for attaching the cover plate. The ratchet plate is co-axially affixed to the open-ended split-center shaft, so that when the ratchet turns the open-ended split-center shaft turns through the same rotation. The ratchet plate is mounted proximal to the base plate, but preferably not in contact with the base plate. Mounted on the same side of the plate are an end of the open-ended split-center shaft, an end of the at least two pack rollers, the means for guiding the strap, an end of the main pintle, and an end of the safety pintle. The cover plate is removably mounted to at least the pack rollers, and receives the open-end of the split-center shaft. The split-center of the open-ended split-center shaft has an opening that is sufficiently wide to receive the thickness of the strap. This thickness is commonly between ⅛ and ½ of an inch, with the most common thickness being ¼ of an inch. It is understood that larger or smaller variations of the invention are anticipated, and do not fall outside the scope of the invention. The at least two pack rollers, the means for guiding the strap, and the open-ended split-center shaft, likewise, have a sufficient length to wind the width of the choke strap. The diameter of the open-ended split-center shaft and the diameter of the ratchet determine the length of strap that can be wound. For instance if the strap material is 0.25 inches, then a 1.0 inch diameter open-ended split-center shaft and 5.0 inch ratchet can hold 6.25 feet. Increasing the shaft to 1.5 inches reduces the length to 6 feet, and increasing the ratchet diameter to 6 inches allows 8.8 feet to be wound. The means for turning the open-ended split-center shaft is a handle or a powered wrench or both. If the means for turning the open-ended split-center shaft is a handle, then the handle is preferably removable, like a socket wrench. If the means is a powered wrench, then a lug wrenches, such as pneumatic or electric wrench, is preferred. Hydraulic wrenches are also anticipated. Many wrenches now, like lug wrenches, are available as either powered or manual.

The means for guiding the strap comprises a first pair of rollers and a second pair of rollers, wherein an end of each of the rollers is mounted on the base plate such that the rollers of the first pair of are separated by a distance slightly wider than the thickness of the strap, and the rollers of the second pair of are similarly separated, and such that the first pair of rollers guides the strap on one side of the open-ended split-center shaft, and the second pair of rollers guides another portion of the strap on another side of open-ended split-center shaft. An end of each roller of the first pair and an end of each roller of the second pair of rollers are mounted on the base plate such that the rollers are distal to the open-ended split-center shaft. The means for guiding the strap further comprises a first backlash roller and a second backlash roller, where an end of the first backlash roller is mounted radial to the open-ended split-center shaft and outside of a normal thread path, and where, on another side of open-ended split-center shaft, an end of the second backlash roller is mounted radial to the open-ended split-center shaft and outside of a normal thread path. The cover plate comprises apertures for receiving an opposing end of the rollers of the first pair, the first backlash roller and the second backlash roller.

The fastening elements for attaching the cover plate are one or more elements selected from the group consisting of quick connecting pins, nuts, cap nuts, wing nuts, cotter pins, ring pins, snap rings, rivets, snaps, spring loaded cams, and the like. The preferred choice of element can be optimized so that for instance a powered wrench or electric screwdriver can be used to attach the fastening elements.

The releasable main pawl of the quick adjusting choke winch is comprised of an elongated pawl, a control arm and a hub, where the control arm has a length that is sufficient to easily apply thumb pressure to disengage the pawl, and where the length is short enough so as to not project beyond an orthogonal plane defined by a perimeter edge of the base plate. The releasable main pawl has a locking mechanism by which the releasable main pawl can be disengaged from the ratchet. The locking mechanism is preferably a thumb switch which shifts a rod such that when the control arm is first depressed, the control arm is restrained by the rod. Alternatively, the locking mechanism can merely be a projection emanating from the base plate, such when the control arm is depressed it slides over the projection. Also, the locking mechanism can be a cam which moves the torsion spring such that torsional force is no longer applied to the main pawl. There is a second pawl, which is a releasable safety pawl. The safety pawl comprises an elongated safety pawl, a safety control arm, and a safety hub. The safety control arm has a length and leverage that is sufficient to easily apply thumb pressure to disengage the pawl, and where the length is short enough so as to not project beyond an orthogonal plane defined by a perimeter edge of the base plate. When the locking mechanism is engaged and simultaneously the safety control arm is depressed, then the open-ended split-center shaft and ratchet can rotate freely. Otherwise, the ratchet is always locked. It is anticipated that additional safety locks can be incorporated into the invention. When a socket wrench type handle is employed the ratcheting action of the handle can be set so that even when the open-ended split-center shaft and ratchet are free to rotate, the handle does not.

The various rollers of the quick adjusting choke winch are comprised of at least one sleeve which rotates on a roller shaft, wherein the roller shaft has an smaller diameter axial end for mounting to the base plate, and a smaller axial opposing end for affixing the cover plate to the roller.

The open-ended split-center shaft comprises a larger two lobe winding drum, wherein the lobes are separated by a distance that is greater than the thickness of the strap, a substantially solid section to which the ratchet attaches, a smaller axial end comprised of a journal and bushing for retaining the journal, and a machined end for connecting to the handle. Optionally, the two lobe winding drum further comprises a secondary journal and a secondary bushing, wherein the secondary bushing is fitted with a secondary collar. The cover plate further comprises a secondary bearing for receiving the open-ended split-center shaft. The bushing of the primary journal is fitted with a collar or some other suitable restraining/centering mechanism to prevent the open-ended split-center shaft from drifting.

The quick adjusting choke is side-threaded by temporarily removing the cover plate, or end threaded like a convention winch.

BRIEF DESCRIPTION OF THE DRAWINGS

FIG. 2 is a plan view as seen from the front of quick adjusting choke winch. As shown, the invention has been fitted to a choke strap, and the cover plate is on.

DETAILED DESCRIPTION OF THE ILLUSTRATED EMBODIMENT

Figure 1:
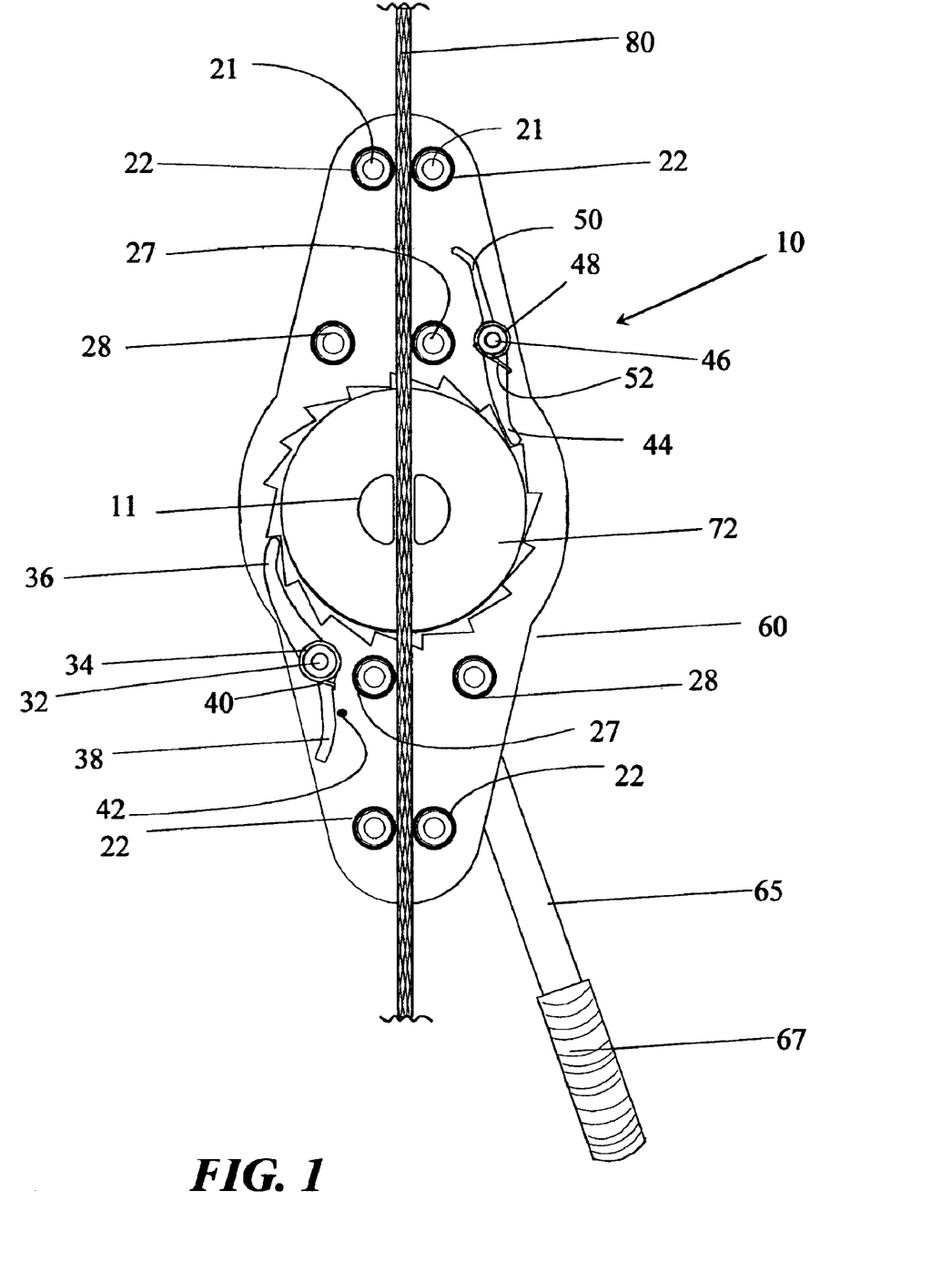
FIG. 1 is a plan view of the inside of the quick adjusting choke winch without the cover plate, which illustrates how the strap is side-threaded. The choke strap is shown.
Figure 2:
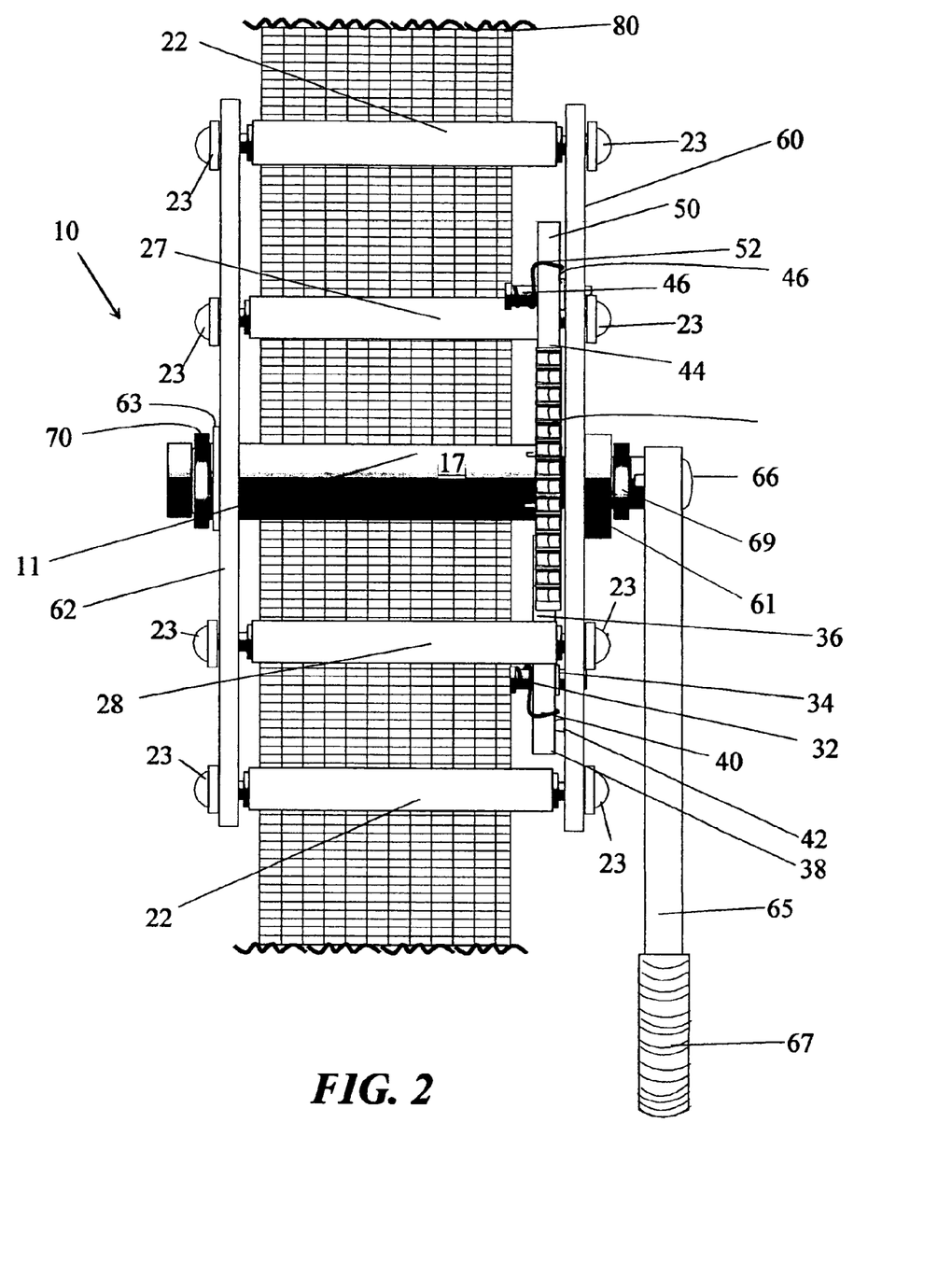
Figure 3:
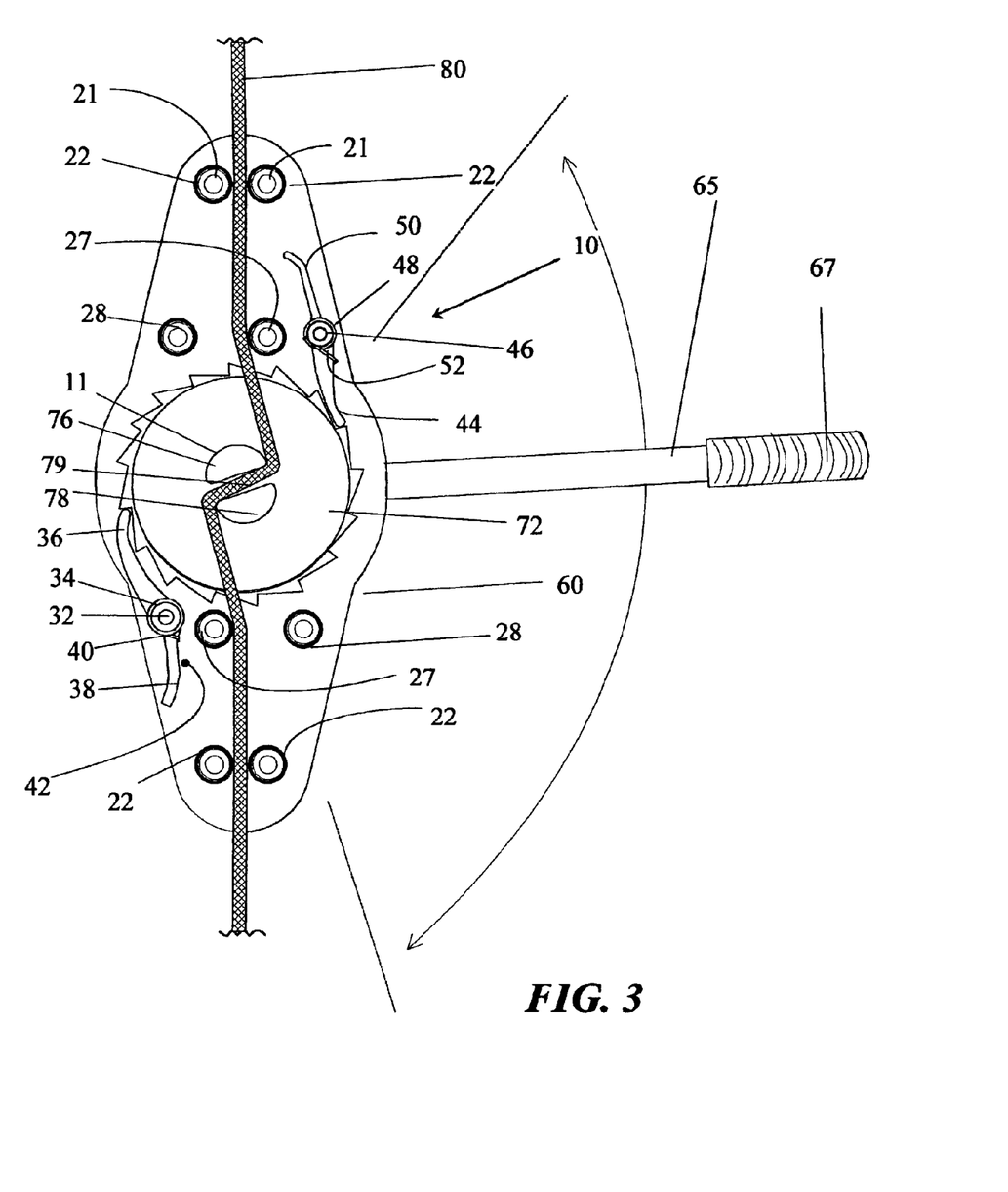
FIG. 3 is a partial view of the invention, which illustrates how the choke strap is wound.
Figure 4:
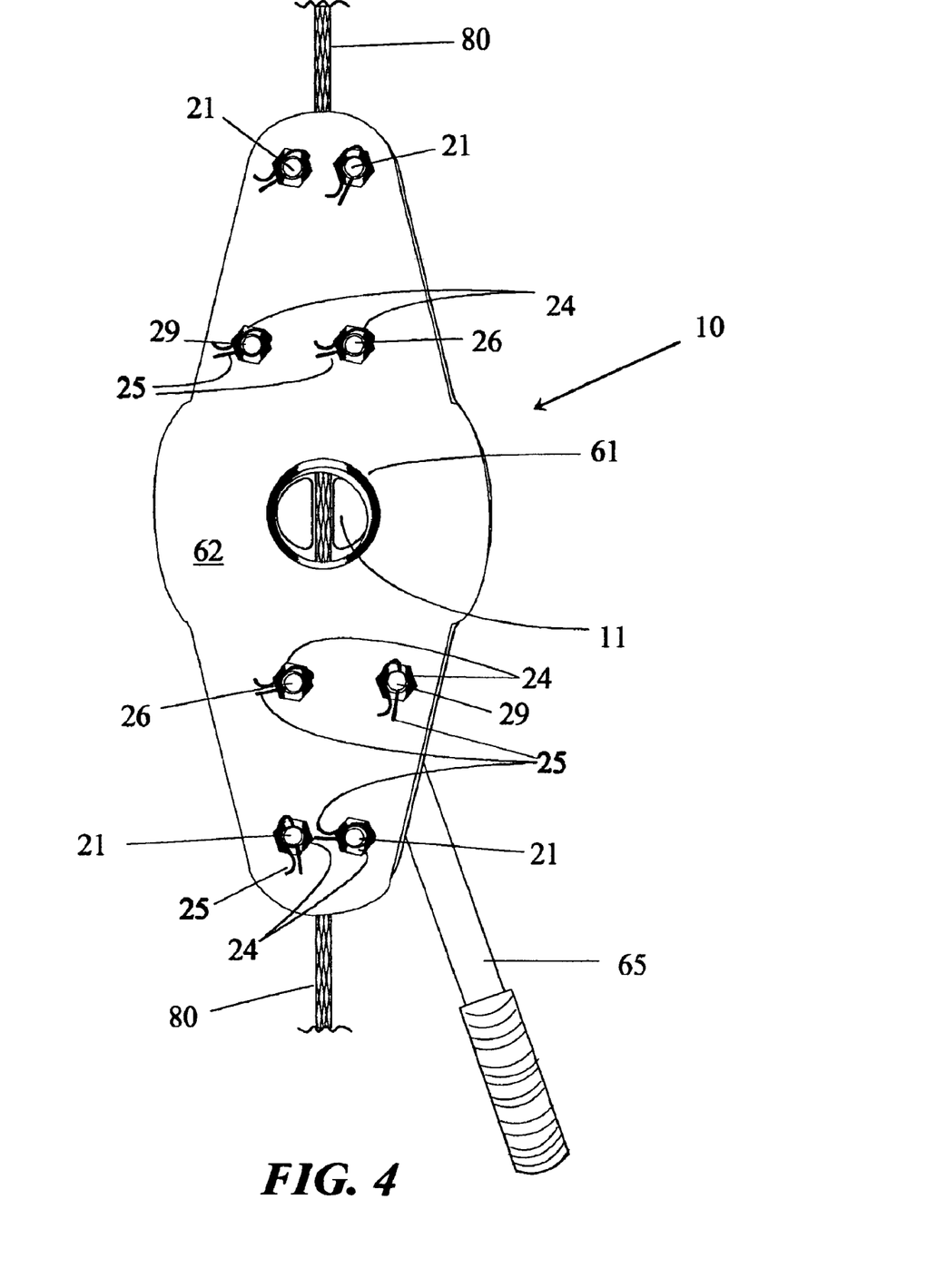
FIG. 4 is a plan view of the quick adjusting choke winch, which particularly points out and illustrates the at least one fastening element for attaching the cover plate, wherein the fastening elements are pins and nuts.

Most of the operational components of the quick adjusting choke winch 10 are shown in FIG. 1. Mounted on an oblong curvilinear base plate 60, which is substantially circular in the center and ellipsoidal lengthwise, therein at the centroid there is an open-ended split-center shaft 11 through which passes a choker strap 80. The open-ended split-center shaft 11 is fitted with a ratchet 72. On opposing sides of the ratchet there are two pack roll, both indicated by 27. The pack rolls, as shown in FIG. 3, establish the tangential angle for the strap as it is wound. Referring again to FIG. 1, there is first pair of rollers 21 and a second pair of rollers 22 located near the radial extremes of the base plate. The pairs of rollers 21 and 22, along with backlash rollers 28, which are also located on opposing sides of the ratchet establish the thread path for the strap 80, and in combination are the means for guiding the choke strap. The backlash rollers additionally provide side-to-side twisting stability to the cover plate. The quick adjusting choke winch 10 has two pawls. The main pawl 36 and the safety pawl 44. The main pawl has a hub 34, to which are integral an elongated pawl 36 and a control arm 38. The hub rotates on pintle 32. The pintle 32 is more clearly seen in the front view as shown in FIG. 2. The elongated pawl is kept engaged with the ratchet by torsion spring 40. Note, the torsion spring 40, in addition to spring loading the pawl, also pushes on the hub 34. The hub can side along the pintle, but only with increased spring resistance. The locking mechanism 42 shown in the embodiment is merely a projection emanating form the base plate 60. When the control arm is pressed hard enough, the control arm 38 bumps over the locking mechanism 38, thereby serving to disengage the pawl 36 from the ratchet 72. The safety pawl has similar components. There is a safety hub 48, a safety pawl 44, a safety control arm 50, a safety torsion spring 52 and a safety pintle 46. There is no way to lock the safety hub, and the safety pawl 44 can only be disengaged by continuously pressing down on the safety control arm 50. Neither safety control arm 50, nor control arm 38 project beyond the edge of the base plate 60 nor the cover plate 62, as seen in FIG. 4.

Figure 5:
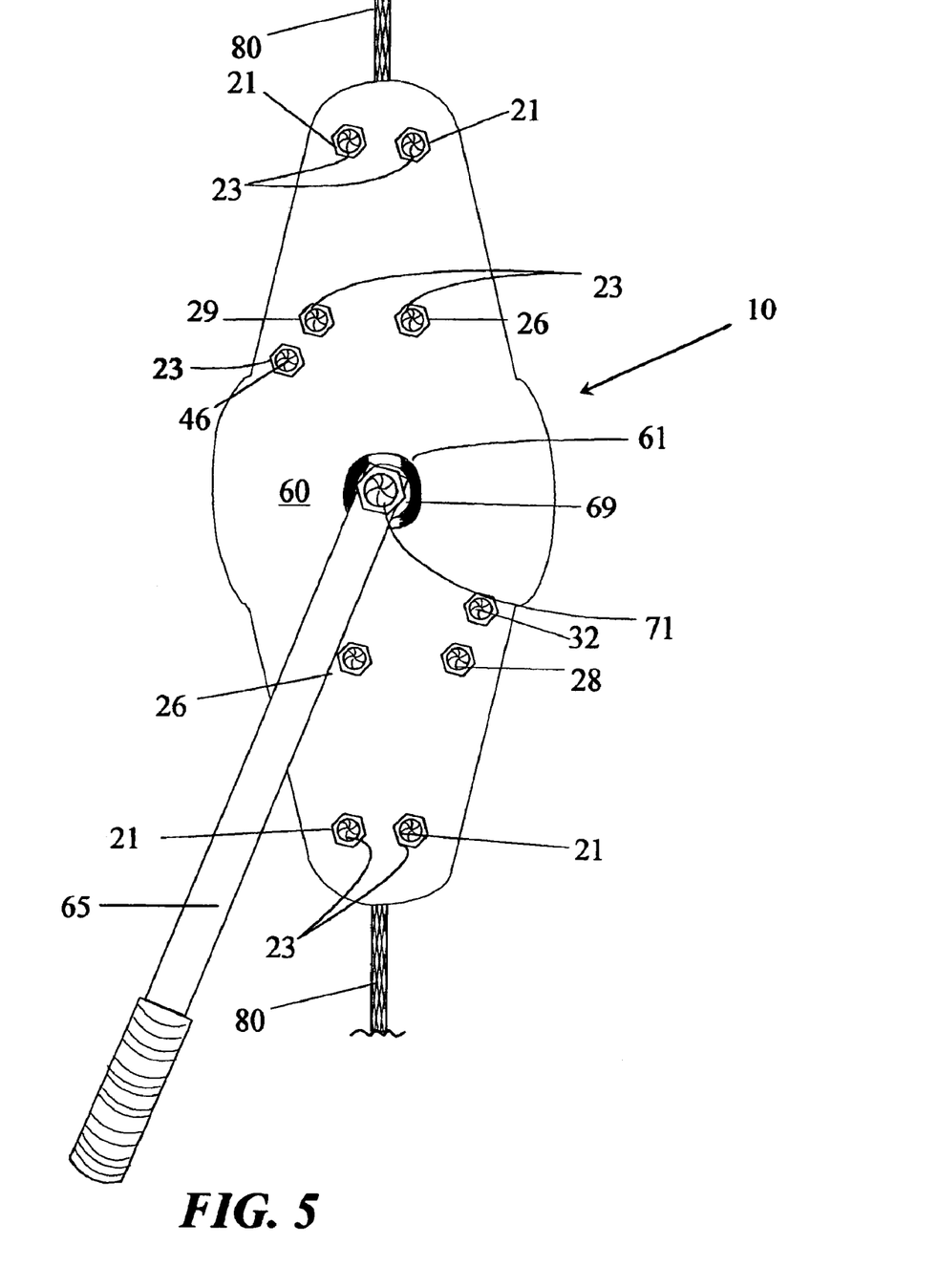
FIG. 5 is a plan view of the quick adjusting choke winch showing the handle side of the base plate.
Figure 6:
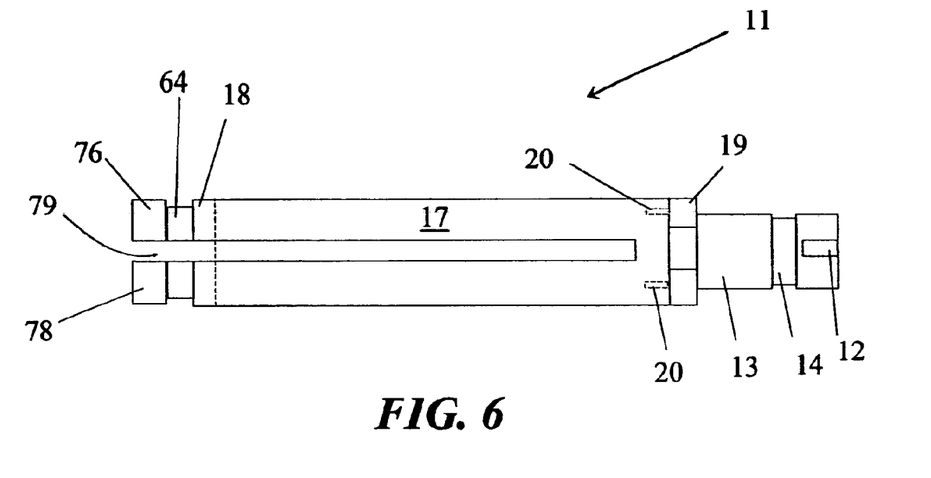
FIG. 6 is an enlarged view of the open-ended split-center shaft.
Figure 9:
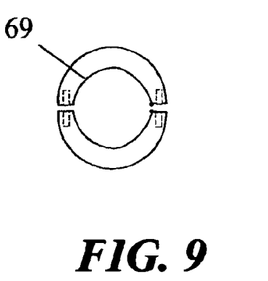
FIG. 9 is an enlarged view of the primary collar, which fits on the primary bushing 14.
Figure 10:
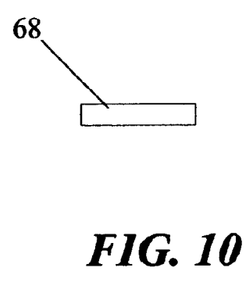
FIG. 10 is a plan view of a shim, which fits in the opening 79 of the open-ended split-center shaft.

Handle 65 having a grip 67 is connected to the open-ended split-center shaft 11 as shown in FIG. 5. As is easily seen the open-ended split-center shaft 11 in FIG. 1 has two lobes, and more detail is shown in FIG. 6. The two lobes 76 and 78 are part of the winding drum 17. A portion of the winding drum acts a secondary journal 18. The journal has a secondary bushing 64, and an optional secondary collar 70. The secondary collar 70, is rarely used except with very heavy objects, and then shim 68 as shown in FIG. 10 is employed. This enables the collar to be tightened and to prevent the lobes 76 & 78 of the winding drum 17 form being bent. The other end of the winding drum 17 is hexagonal shaped 19 to receive the ratchet having a hexagonal center (not shown). The ratchet is further secured to the winding drum 17 with threaded taps 20. The end of the open-ended split-center shaft 11 that is mounted on the base plate 60 has a primary journal 13, which turns in bearing 61, as shown in FIG. 2. The primary journal 13 is undercut from the winding drum 17. The bushing 14 receives the collar 69 shown in FIG. 9. The end of the open-ended split-center shaft 11 has a channel 12 for receiving a square head snap-on socket wrench. The end of the primary journal 13 is hexagonal so that it maybe engaged by a lug wrench.

Figure 7:
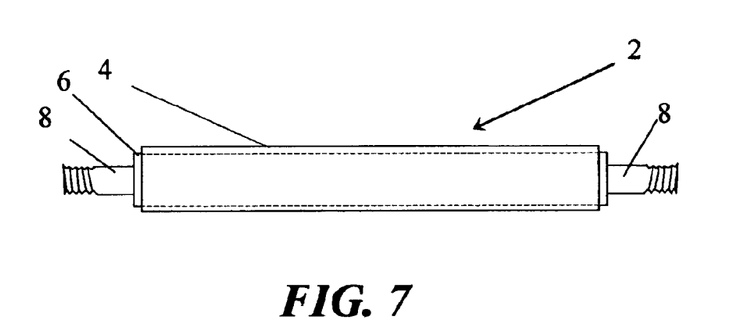
FIG. 7 is an enlarged view of a roller, wherein the roller could be a backlash roller, a pack roller, a roller of the first pair, or a roller of the second pair.
Figure 8:
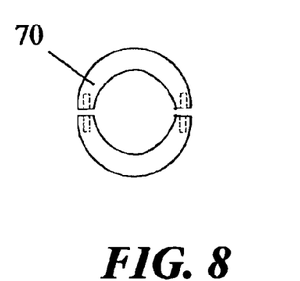
FIG. 8 is an enlarged view of the secondary collar, which fits on the secondary bushing 64.

A roller is shown in detail in FIG. 7. The roller 2 is comprised of a sleeve 4, which that rotates on an axle 6. The axle 6 has a roller axle 8 which has ends for mounting to the base plate 60, and reversibly connecting to the cover plate. The roller 2 shown in FIG. 7 has threaded ends to receive cap nuts 28, as shown in FIG. 5 and nuts 24 and pins 25 as shown in FIG. 4.

FIG. 2 is a plan view of the quick adjusting choke winch 10, as seen from the front, which illustrate the relative position of the strap 80 with respect to the operation components of the invention. In FIG. 2 the secondary collar 70 as well as the primary collar 69 are shown. The base plate 60 has a bearing 61, in which the open-ended split-center shaft 11 rotates. Cover plate 62 has a secondary bearing 63 which receives the secondary journal 18 portion of the winding drum 17. In this version of the illustrated embodiment the cover plate 62 is attached using cap nuts 23. The handle 65 has a grip 76 and a quick release button 66 for unsnapping the socket wrench type handle.

FIG. 3 illustrates the action of the handle and the resulting winding action. The handle 65 can either be moved in a back-and-forth action, as shown by the double arrowed arc, or moved in a full circle. Either action causes the lobes 76 & 78 of the open-ended split-center shaft 11 to rotate, thereby forcing the strap to be wound from two directions. The strap is pulled in through the first pair of roller 21 and the second pair of rollers 22. The main pawl 36 and the safety pawl 44 prevent the open-ended split-center shaft 11 from rotating backwards. As shown in FIG. 3 from the viewers perspective the open-ended split-center shaft is rotating clockwise.

FIG. 4 is a plan view of the quick adjusting choke winch, which particularly points out and illustrates the at least one fastening element for attaching the cover plate, wherein the fastening elements are pins 25 and nuts 24. The shim 68 is not present and the strap is visible in the open-ended split-center shaft 11. The secondary bearing 61 supports the winding drum of the shaft.

Figure 11:
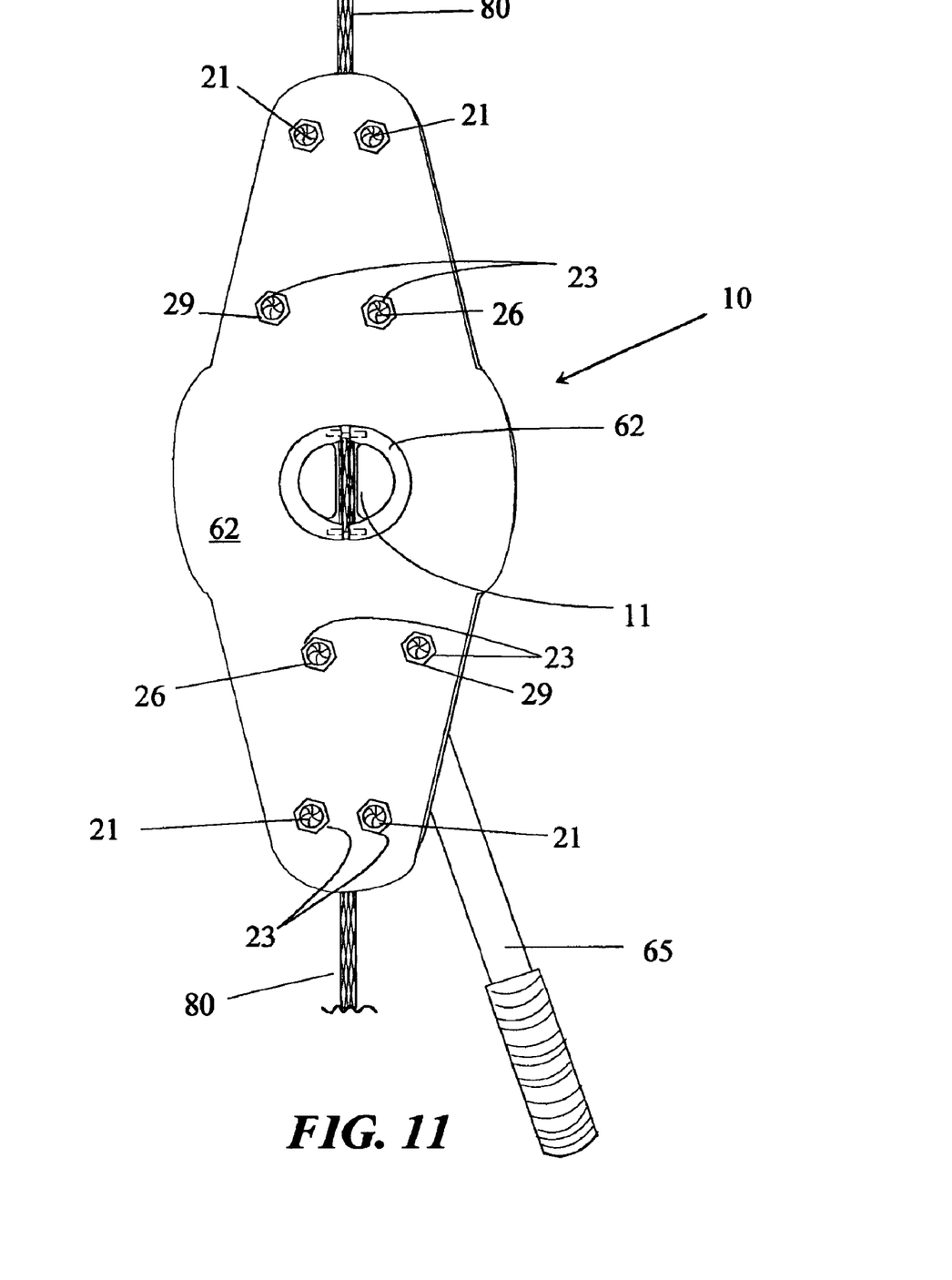
FIG. 11 is a plan view of the quick adjusting choke winch, which particularly points out and illustrates the at least one fastening element for attaching the cover plate, wherein the fastening elements are cap nuts.

FIG. 11 is a plan view of the quick adjusting choke winch showing fastening elements cap nuts 23. The cap nut 23 are fastened to the first pair of rollers 21, the second pair of rollers 22, the backlash rollers 29, and the pack rollers 26. The secondary collar 62 is also shown A handle that is permanently attached is shown in FIG. 5, which is a plan view of the quick adjusting choke winch showing the handle side of the base plate. The handle is attached with bolt 71. The pintle for the main pawl is 32, and the safety pintle for the safety pawl is 46. Both are marked with the appropriate indicia.

Figure 12:
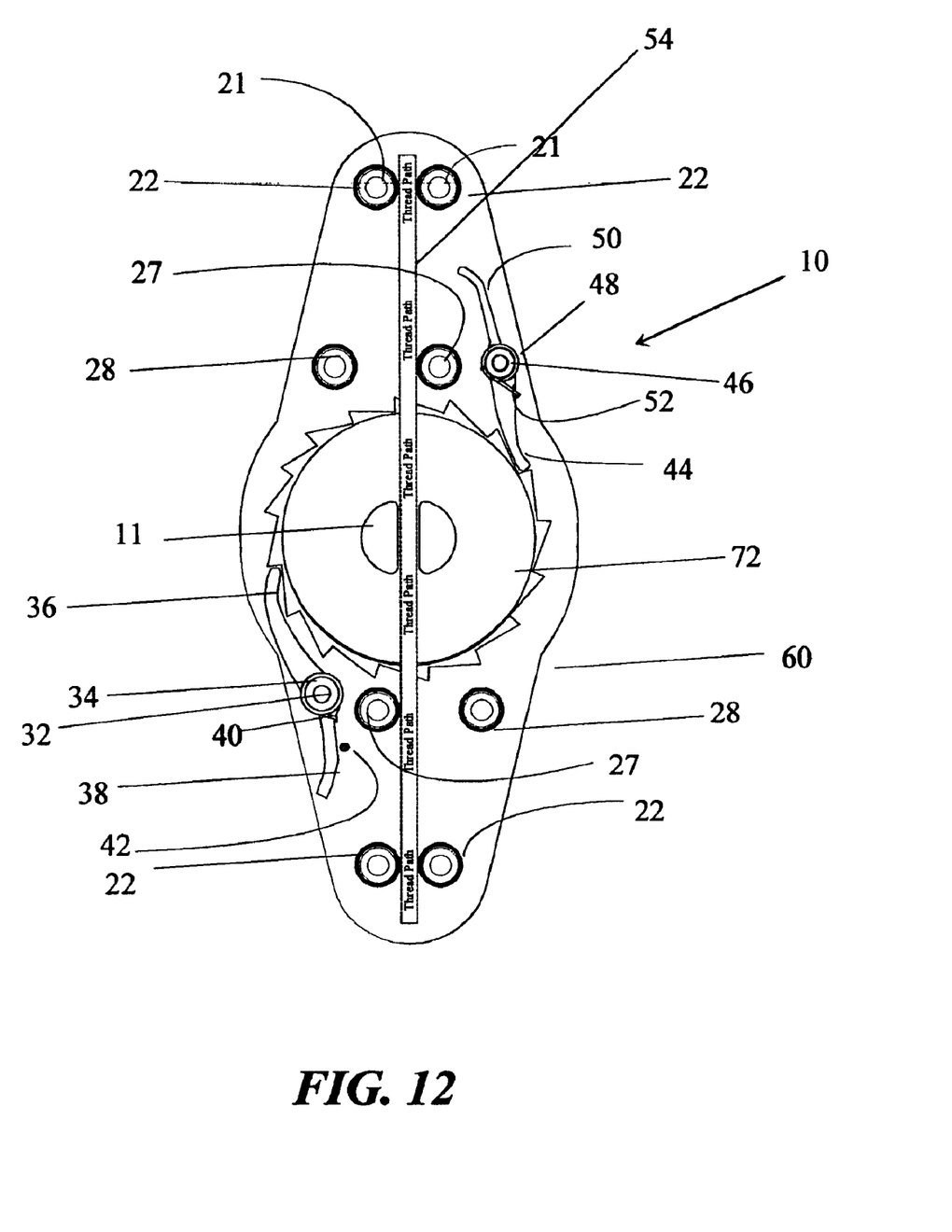
FIG. 12 is a plan view of the inside of the quick adjusting choke winch without the cover plate, showing the threading diagram. The handle is not attached.

In FIG. 12, the handle 65 is removed. The choke strap has not yet been threaded, and the threading diagram 54 is visible to help the user side-thread the winch 10.

The invention is used as follows. The object being lifted by the crane is fitted with choke straps. The crane operator lifts the object slightly off the supporting surface, and support crew inspect the orientation of the object and inspect the tautness of the choke straps. If the both are suitable the quick adjusting choke winch would not be used. If a strap is slack, then with the cover plate removed, the strap is threaded so that is passes between the first and second pair of rollers 21 & 22, and through the opening 79 of the wind drum 17 of the open-ended split-center shaft 11. The cover plate 62 is positioned so that the secondary journal 18 is received by the secondary bearing 61. The covering plate 62 is aligned with and pushed on the ends of the roller axles 8, and then the fastening elements are attached securing the cover plate 62. A member of the support crew would then, grasping the winch with one hand, pump the handle until the choke strap attained a tautness comparable to the other straps. The crane operator would then again lift the object and again check the orientation and tension. If further refinements were necessary the choke strap could be further tightened by pumping the handle, or loosened by simultaneously slightly lifting up on the handle, and then disengaging the main pawl via the locking mechanism. Then again, slightly raising the handle and simultaneously pressing the safety pawl and stepping down the ratchet one gear at a time. Using the following procedure the object will be under control at all times.

What I claim is:

1. A quick adjusting choke winch for winding a choke strap having a thickness and a width, said quick adjusting choke winch comprising:
   a base plate having a bearing;
   an open-ended split-center shaft;
   at least two pack rollers;
   a means for guiding the strap;
   a ratchet plate;
   a releasable main pawl, main pintle and main torsion spring;
   a releasable safety pawl, safety pintle and safety torsion spring;
   a means for turning the open-ended split-center shaft;
   a cover plate;
   at least one fastening element for attaching the cover plate;
   wherein the ratchet plate is co-axially affixed to the open-ended split-center shaft;
   wherein mounted on the same side of the plate are an end of the open-ended split-center shaft, an end of the at least two pack rollers, the means for guiding the choke strap, an end of the main pintle, and an end of the safety pintle;
   wherein the cover plate is removably mounted to at least the pack rollers, therein said cover plate receiving the open-end of the split-center shaft;
   wherein the split-center of the open-ended split-center shaft has an opening that is sufficiently wide to receive the thickness of the strap;
   wherein the at least two pack rollers, the means for guiding the strap, and the open-ended split-center shaft have a sufficient length to wind the width of the choke strap; and
   wherein said quick adjusting choke winch can be side-threaded or end threaded.

2. The quick adjusting choke winch as claimed in claim 1, wherein said ratchet plate is mounted on the open-ended split-center shaft that is proximal to the base plate.

3. The quick adjusting choke winch as claimed in claim 2, wherein said means for turning the open-ended split-center shaft is a handle.

4. The quick adjusting choke winch as claimed in claim 3, wherein said handle is removable.

5. The quick adjusting choke winch as claimed in claim 1, wherein said means for guiding the choke strap comprises a first pair of rollers and a second pair of rollers, wherein an end of each of the rollers is mounted on the base plate such that the rollers of the first pair are separated by a distance slightly wider than the thickness of the choke strap, and the rollers of the second pair are similarly separated, and such that the first pair of rollers guide the strap on one side of the open-ended split-center shaft, and the second pair of rollers guide another portion of the strap on another side of open-ended split-center shaft.

6. A quick adjusting choke winch as claimed in claim 5, wherein an end of each roller of the first pair and an end of each roller of the second pair of rollers are mounted on the base plate such that the rollers are distal to the open-ended split-center shaft.

7. The quick adjusting choke winch as claimed in claim 5, wherein said means for guiding the choke strap further comprises a first backlash roller and a second backlash roller, where an end of the first backlash roller is mounted radial to the open-ended split-center shaft and outside of a normal thread path, and where, on another side of open-ended split-center shaft, an end of the second backlash roller is mounted radial to the open-ended split-center shaft and outside of a normal thread path.

8. The quick adjusting choke winch as claimed in claim 7, wherein said wherein the cover plate comprises apertures for receiving an opposing end of the rollers of the first pair, the first backlash roller and the second backlash roller.

9. The quick adjusting choke winch as claimed in claim 8, wherein said at least one fastening element for attaching the cover plate comprises one or more elements selected from the group consisting of quick connecting pins, nuts, cap nuts, wing nuts, cotter pins, ring pins, snap rings, rivets, snaps, spring loaded cams.

10. The quick adjusting choke winch as claimed in claim 8, wherein said cover plate further comprises a secondary bearing for receiving the open-ended split-center shaft.

11. The quick adjusting choke winch as claimed in claim 7, wherein said roller is comprised of at least one sleeve which rotates on a roller shaft, wherein the roller shaft has a smaller axial end for mounting to the base plate, and a smaller axial opposing end for affixing the cover plate to the roller.

12. The quick adjusting choke winch as claimed in claim 7, wherein said open-ended split-center shaft comprises a larger two lobe winding drum, wherein the lobes are separated by a distance that is greater than the thickness of the strap, a substantially solid section to which the ratchet attaches, a smaller axial end comprised of a journal and bushing for retaining the journal, and a machined end for connecting to the handle.

13. The quick adjusting choke winch as claimed in claim 12, wherein said two lobe winding drum further comprises a secondary journal and a secondary bushing.

14. The quick adjusting choke winch as claimed in claim 13, wherein the bushing of said open-ended split-center shaft is fitted with a collar, and the secondary bushing is fitted with a secondary collar.

15. The quick adjusting choke winch as claimed in claim 12, wherein said base plate has a threading diagram.

16. The quick adjusting choke winch as claimed in claim 1, wherein said releasable main pawl is comprised of an elongated pawl, a control arm and a hub, where the control arm has a length that is sufficient to easily apply thumb pressure to disengage the pawl, and where the length is short enough so as to not project beyond an orthogonal plane defined by a perimeter edge of the base plate.

17. The quick adjusting choke winch as claimed in claim 16, wherein said releasable main pawl further comprises a locking mechanism by which the releasable main pawl can be displaced from the ratchet.

18. The quick adjusting choke winch as claimed in claim 17, wherein said locking mechanism is a thumb switch which shifts a rod such that when the control arm is first depressed, then the control arm is restrained by the rod, or the locking mechanism is a projection emanating from the base plate, such when the control arm is depressed it slides over the projection, or the locking mechanism shifts a cam which moves the torsion spring so that the torsional force is no longer applied to the main pawl.

19. The quick adjusting choke winch as claimed in claim 17, wherein said releasable safety pawl is comprised of an elongated safety pawl, a safety control arm and a safety hub, where the safety control arm has a length that is sufficient to easily apply thumb pressure to disengage the pawl, and where the length is short enough so as to not project beyond an orthogonal plane defined by a perimeter edge of the base plate.

20. The quick adjusting choke winch as claimed in claim 19, wherein when the locking mechanism is engaged and the safety control arm is depressed the open-ended split-center shaft and ratchet can rotate freely.

21. The quick adjusting choke winch as claimed in claim 19, wherein said handle has a socket wrench coupling mechanism for connecting to the end of the open-ended split-center shaft type.

22. The quick adjusting choke winch as claimed in claim 19, wherein when the locking mechanism is engaged and the safety control arm is depressed the open-ended split-center shaft and ratchet can rotate freely, and the handle does not rotate.

23. The quick adjusting choke winch as claimed in claim 1, wherein said means for turning the open-ended split-center shaft cover plate is a powered wrench.

* * * * *